C. H. McCormick.

Mower.

Reissued May 24, 1853.
Reissued Dec. 21, 1858.
Reissued Sep. 20, 1859.

No. 820

Sheet 2
2 Sheets.

C. H. McCormick.

Mower.

Reissued May 24, 1853.
Reissued Dec. 21, 1858.
Reissued Sep. 20, 1859.

No. 820

UNITED STATES PATENT OFFICE.

CYRUS H. McCORMICK, OF CHICAGO, ILLINOIS.

IMPROVEMENT IN REAPING-MACHINES.

Specification forming part of Letters Patent No. 5,335, dated October 23, 1847; Reissue No. 239, dated May 24, 1853; Reissue No. 637, dated December 21, 1858; Reissue No. 820, dated September 20, 1859.

DIVISION E.

*To all whom it may concern:*

Be it known that I, CYRUS H. McCORMICK, of Chicago, in the county of Cook and State of Illinois, have invented a new and useful Improvement in Reaping-Machines, of which the following is a full, clear, and exact description, reference being had to the accompanying drawings, making part of this specification, in which—

Figure 1:
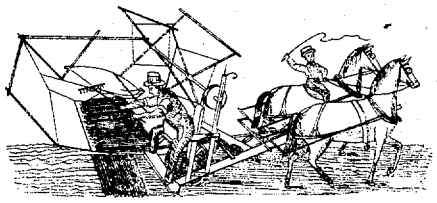
Figure 2:
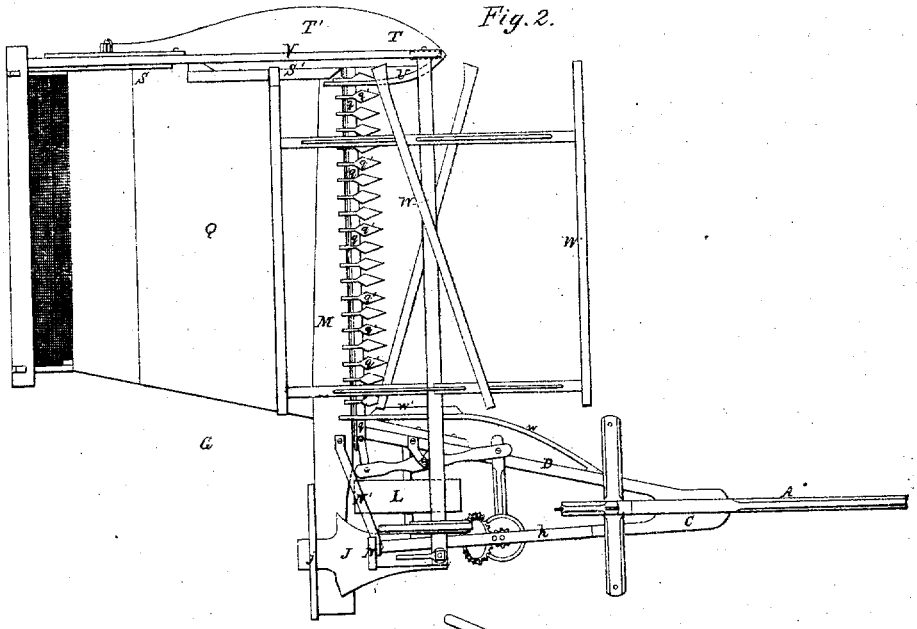
Figure 3:
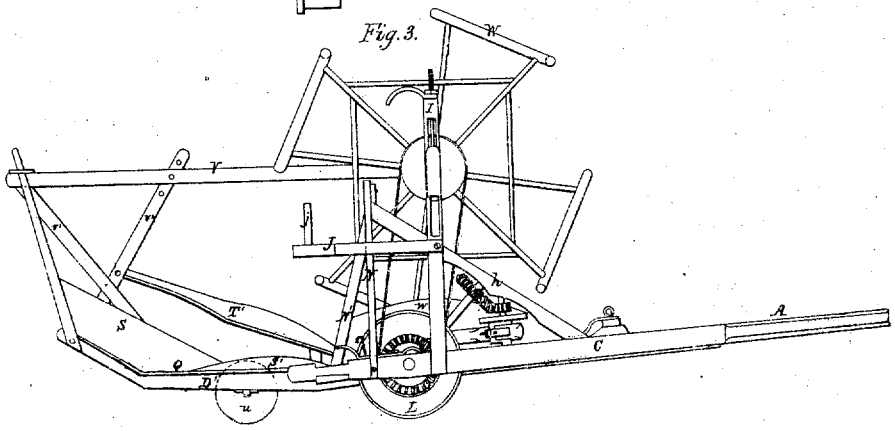
Figure 4:
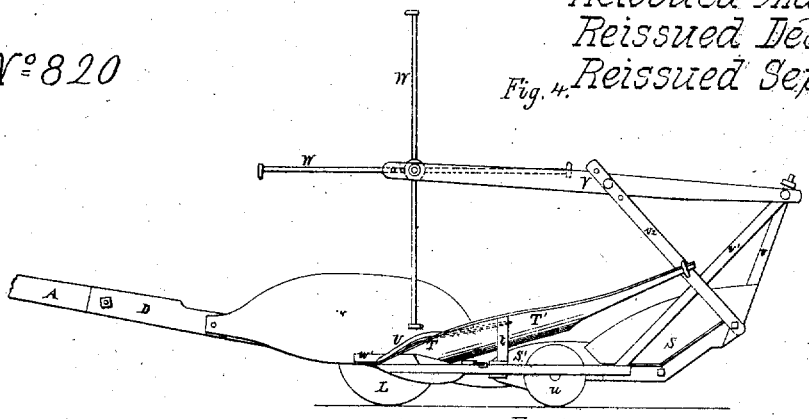
Figure 5:
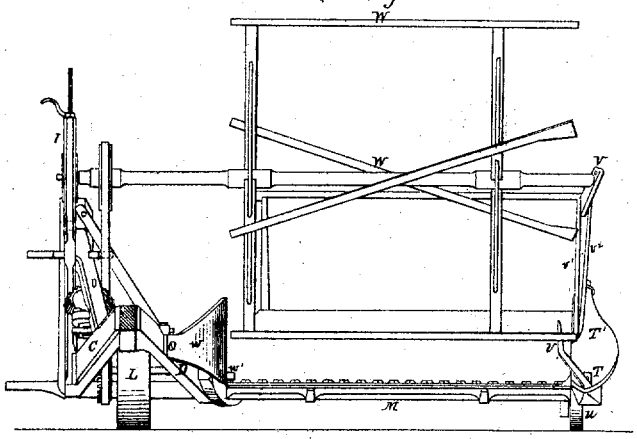
Figure 6:
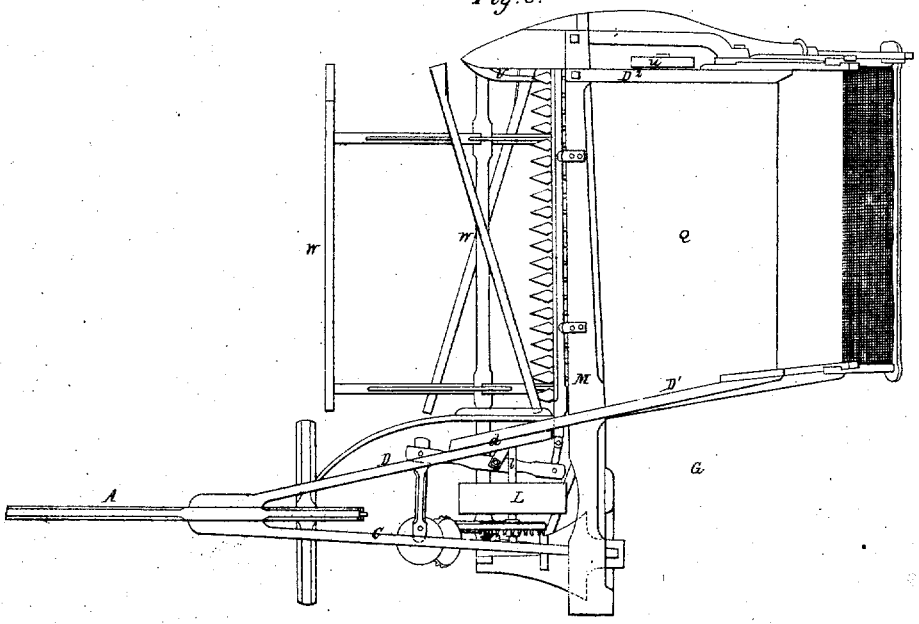

Figure 1 represents in perspective a side-draft-reel reaping-machine embracing my said improvement. Fig. 2 represents a plan of such a machine as seen from above. Fig. 3 represents an elevation of the inner side of the machine. Fig. 4 represents an elevation of the outer side of the machine. Fig. 5 represents an elevation of the front of the machine, and Fig. 6 represents a view of the under side of the machine.

That side of the machine to which the horses are attached, and which runs next the stubble, I call the "inner" side, and the opposite side of the machine, which runs next the uncut grain, I call the "outer" side of the machine.

The improvement claimed under this patent has for its object the gathering, in a side-draft and side-gearing reaping-machine, of the grain, as it is cut, in a quantity sufficient to form a gavel or sheaf, upon a platform but little longer or no longer than the cutting apparatus; or, in other words, the gathering of the whole width of the swath of the cut grain upon as narrow a platform as possible, so that it may lie compactly thereon, and may be discharged therefrom by moving it sidewise but a short distance, and when discharged may lie on or near the stubble-side margin of the swath in which it is cut.

With these objects in view I have combined the following elements, viz: first, two compressing-surfaces projecting forward and diverging outward, one from each end of the cutting apparatus, to bring the grain while being cut into a breadth narrower than the swath by compressing the swath on both sides as the cutter advances. These surfaces, converging toward the cutter, I term "compressors;" second, a short reel to aid in forcing the grain through the space between the compressors in bearing it against the cutter, and, when cut, in depositing it upon the platform; third, a short platform—that is to say, a platform which does not extend substantially beyond the stubble side of the swath; fourth, the draft of the machine arranged at its side; fifth, the gearing arranged at the side of the machine and behind the horses, so as not to impede the delivery of the grain on or near the stubble side of the swath. An advantage resulting from this compression of the swath preparatory to being cut is the narrowing of the machine, with a corresponding diminution of side draft.

In the drawings I have shown this improvement applied to a McCormick reaping-machine, but deem it unnecessary to describe in detail any more of that machine than is needful to a proper understanding of this improvement.

In the accompanying drawings, M represents a strong beam, called the "finger-beam" or "finger-piece," forming the front part of the platform Q, to the outer part of the forward edge of which beam are secured the guard-fingers P, across which a vibrating sickle plays. The finger-beam is connected at the inner end to the rear ends of oblique hounds or beams C and D, which converge at their front ends toward the rear end of the tongue A, to which they are fastened. The driving-wheel and the gearing are arranged, as represented in the drawings, at the side of the machine, between the hounds C and D.

The compressor at the outer end of the cutter is formed by the inner side of the divider. The compressor at the inner end of the cutter is formed by the inner side of a board, *w*, having a rib, *w'*, near the lower edge. The board *w* serves the additional purpose of preventing grain from getting into and entangling the gearing and driving-wheel, but, so far as it serves this purpose, has nothing to do with the invention claimed under this patent. The sides of the board *w* and of the divider next the swath are not parallel, but diverge as they extend forward, that they may embrace the stalks on both sides of the swath and press them inward as they pass backward to the cutter, the convergence of the sides of the compressors producing the compression or contraction of the swath.

A reel, W, is supported over the space between the compressors in such manner that its ribs or bars may force the grain through that space and bear it backward against the cutter, and, when cut, turn it upon the platform. The compressed swath can be embraced and gathered by a shorter reel than would be required if the swath were not compressed.

The platform Q is supported by the frame immediately in the rear of the cutter.

What I claim under this patent as my invention is—

The combination, in a reaping-machine, of the following elements, namely: the draft and the gearing arranged at the side of the machine, two compressors, one arranged at each end of the cutter, the short reel to sweep over the space between the compressors, and the short platform, substantially as described.

In testimony whereof I have hereunto signed my name.

C. H. McCORMICK.

In presence of—

P. H. WATSON,

JOHN S. HOLLINGSHEAD.